M. L. BASTIAN.
TIRE PUMP FOR MOTOR VEHICLES.
APPLICATION FILED JAN. 16, 1909.
948,807.
Patented Feb. 8, 1910.
2 SHEETS—SHEET 1.
FIG. I.
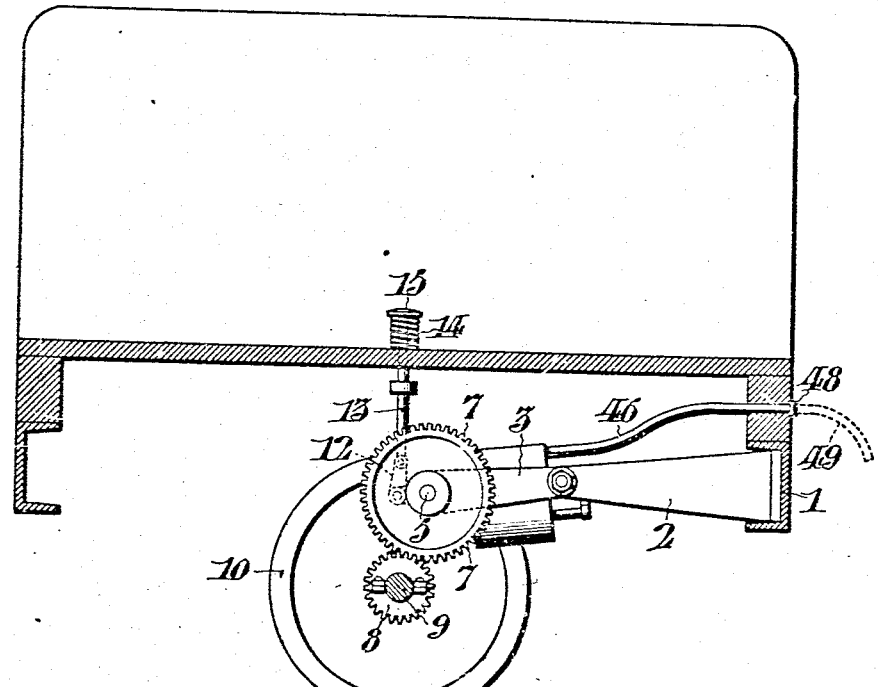
FIG. II.
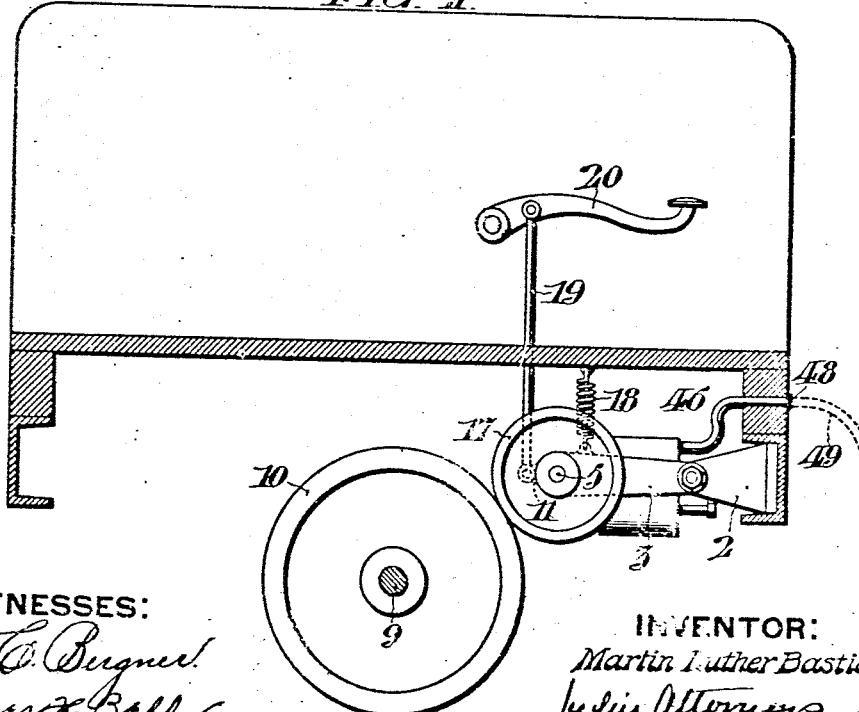
WITNESSES:
John C. Bugner
James L. Bell
INVENTOR:
Martin Luther Bastian,
by his Attorneys
Seely & Paul M. L. BASTIAN.
TIRE PUMP FOR MOTOR VEHICLES.
APPLICATION FILED JAN. 16, 1909.
948,807.
Patented Feb. 8, 1910.
2 SHEETS—SHEET 2.
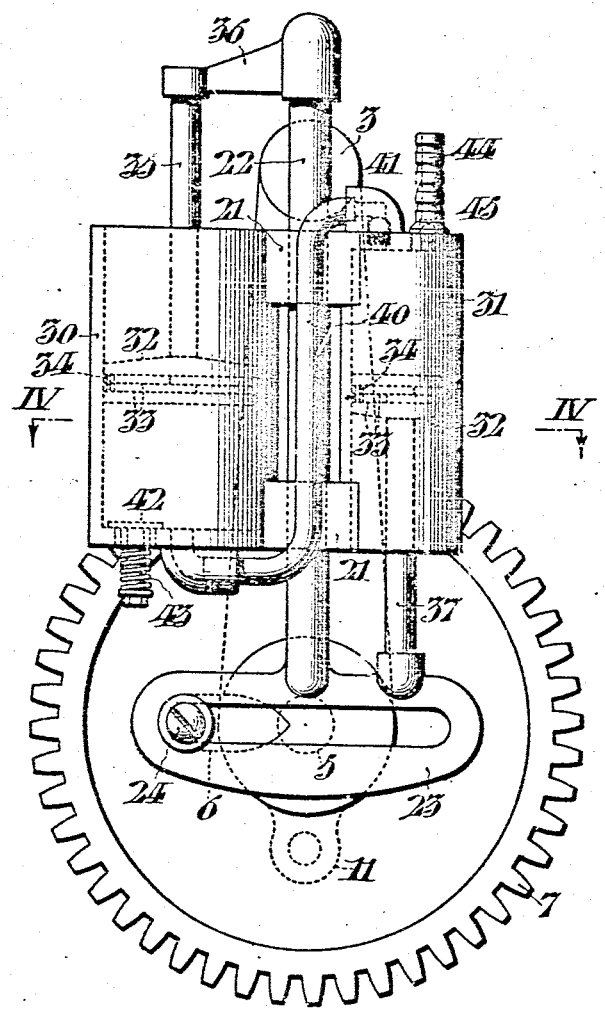
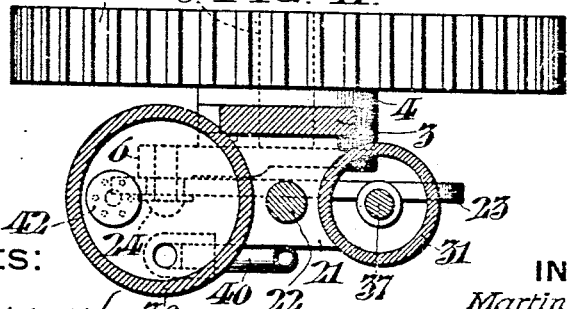
WITNESSES:
John C. Bergner
James H. Bell
INVENTOR:
Martin Luther Bastian,
by his Attorneys

UNITED STATES PATENT OFFICE.

MARTIN LUTHER BASTIAN, OF PHILADELPHIA, PENNSYLVANIA, ASSIGNOR TO OLNEY AUTOMOBILE COMPANY, LIMITED, OF PHILADELPHIA, PENNSYLVANIA, A PENNSYLVANIA LIMITED PARTNERSHIP.

TIRE-PUMP FOR MOTOR-VEHICLES.

948,807.  Specification of Letters Patent.  Patented Feb. 8, 1910.

Application filed January 13, 1909. Serial No. 472,608.

*To all whom it may concern:*

Be it known that I, MARTIN LUTHER BASTIAN, of Philadelphia, in the county of Philadelphia and State of Pennsylvania, have invented certain new and useful Improvements in Tire-Pumps for Motor-Vehicles, whereof the following is a specification, reference being had to the accompanying drawings.

My invention relates to a pump, which is especially adapted to be mounted upon a motor vehicle, and used to inflate the tires thereof. I have illustrated my pump as thus applied. It is mounted in such a way as to be driven when desired from the main shaft of the motor vehicle, and I have illustrated means under control of a treadle whereby the pump driving mechanism is thrown into operative connection with the driving shaft by means of said treadle.

By the employment of a compound pump, such as I will describe, I not only secure a more effective pump, and a more steady flow of air in the tire, thus obviating the objectionable effect of intermittent pumping, but I secure a more even distribution of the strain upon the moving parts of the pumping mechanism and thus make it possible to swivel the pump, so that it can be moved by a treadle into or out of position to engage the driving mechanism, without the interposition of a separate shaft, and separate clutch thereon.

My invention accordingly relates to the compound pump of the character about to be described, to its method of swiveling upon the frame of the motor vehicle, and to the mechanism for rendering the actuation of the pump by the said motor dependent upon the will of the operator of the vehicle.

In the accompanying drawings, Figure I, is a partial sectional view of the framework of a motor vehicle in the region of the fly wheel and illustrating one method of mounting my pump thereon. Fig. II, is a similar view illustrating a different method of mounting and actuating the pump. Fig. III, is a side elevational view of my pump. Fig. IV, is a sectional view thereof, taken along the line IV, IV, in Fig. III.

Referring to Fig. I, the side frame 1, is provided with a horizontal standard 2, having pivoted to its outer extremity the swivel arm 3, upon which my pump is mounted. The other extremity of this swivel arm forms a bearing 4, carrying a short shaft 5, with a crank disk 6, on one side of the bearing and a gear wheel 7, on the other side. This gear wheel is in a plane to engage a pinion 8, set upon the driving shaft 9, of the vehicle, preferably in as convenient proximity to the fly wheel 10, as the construction of the vehicle will admit. The swivel arm 3, is prolonged beyond the bearing in the form of a pivot lug 11, to which is pivoted a link 12, the other extremity of which is pivoted to the lower end of a plunger rod 13, mounted in the floor of the vehicle and encircled by a coiled spring 14, by which it is upwardly spring-pressed sufficiently to normally maintain the gear 7, out of engagement with the pinion 8, but capable of being depressed against the action of the spring by the treadle 15, so as to effect engagement of the gear and pinion.

The parts thus far described have relation only to the swiveling and actuation of the pump, and it is convenient to here describe the modified forms of these parts illustrated in Fig. II. In this latter figure, instead of the gear wheel, a friction disk 17, is substituted, lying in the plane of the fly wheel 10. The upward tension upon the swivel arm is accomplished by a spring 18, and its downward pressure against the action of this spring is accomplished by the rod 19, when depressed by the treadle 20. This construction may be resorted to when the construction of the vehicle will not permit access to the driving shaft for the insertion of a pinion as described above.

I will now describe the pumping mechanism proper, which is similar in both the varying arrangements illustrated in Figs. I, and II. This pumping mechanism is more adequately illustrated in Figs. III, and IV, to which reference is particularly made in the following description. The swivel arm 3, has formed upon its side, two lugs 21, 21, within which a slide rod 22, is seated. One extremity of this slide rod carries a slotted plate 23, within the slot of which is engaged the crank pin 24, of the crank disk 6.

The compound pump consists of two cylinders, each having a closed and an open end. The low pressure cylinder 30, is mounted upon one side, and the high pressure cylinder 31, is mounted upon the other side of the lugs 21, 21, which have been referred to as the seat of the slide rod 22. These two cylinders are mounted in inverted parallelism, that is, with their open ends in opposite directions. Each cylinder contains a piston 32, within the groove, in which are seated two split rings 33, of packing metal, such as bronze. These two packing rings are placed with their split portions out of coincidence, and preferably opposed to each other, and are held together in this relation by means of a pin 34. The piston rod 35, of the low pressure cylinder is attached to an arm 36, mounted upon one extremity of the slide rod 22, while the piston rod 37, of the high pressure cylinder is attached to one side of the slotted plate 23, to which reference has already been made.

It will be observed that the parts which have just been described not only operate in parallelism, but their strains are opposed to each other in such a way as to balance the mechanism and prevent undue lateral strain upon either the piston rods, or the slide rod 22, by which they are connected.

The closed ends of the pistons are connected by means of a pipe 40, with interposition of a check valve 41, preventing the reflux of compressed air from the high pressure cylinder. The closed end of the low pressure cylinder 30, is further provided with a valve 42, conveniently seated upon its bottom, and closed by a coiled spring 43, encircling its spindle against the pressure of which it opens as the piston exhausts the air therein. The high pressure cylinder 31, is provided at its closed end with an exit nozzle 44, within which is seated the check valve 45, whereby the reflux of air into the high pressure cylinder is prevented.

In both modifications of my device which I have described, the nozzle 44, is permanently connected by means of a flexible tube 46, to a second nozzle 48, conveniently seated upon the outer side of the vehicle and provided with a small hose 49, which may be connected with, and thus employed for the purpose of inflating any one of the tires of the vehicle.

In operation when it is desired to inflate a tire, the connections which have just been described are completed, and by depression of the treadle the pump is put into operative connection with the driving shaft of the vehicle. The reciprocation of the pump thus effected is double-acting, in that the half-stroke in one direction compresses air in the low pressure cylinder, while the half-stroke in the other direction effects compression in the high pressure cylinder, thus balancing the action of the pump and rendering its action more or less continuous.

The compression effected by the low pressure cylinder is maintained in the high pressure cylinder, by reason of the latter's smaller volume, and upon the return stroke, the air is further compressed in the latter cylinder, and in this state of high compression is forced into the tire. But it will be observed that the inflation of the tire is not limited to the compressive action of the high pressure piston, but takes place to a certain extent during the stroke of the low pressure piston, because the pressure thereby created when forced into the high pressure cylinder overflows through the check valve 45, into the tire during the half-stroke which drives air from the low pressure cylinder. There is, therefore, a more or less continuous injection of compressed air into the tire, and a much easier action of inflation than that which occurs where the injection is effected wholly by an intermittent stroke.

Further advantages inhering in my construction are the lightness and compactness of the pumping mechanism, and the readiness with which it is all mounted upon the swivel arm, whereby the direct drive without the interposition of a separate shaft and clutch is secured.

Having thus described my invention, I claim:—

1. A pump for inflating tires including in combination, high and low pressure cylinders, pistons operating in said cylinders, piston rods connected to said pistons and extending in opposite directions, means for reciprocating said piston rods comprising a device having said piston rods attached thereto, and a valve connection for connecting the low pressure cylinder with the high pressure cylinder, whereby said low pressure cylinder is exhausted into the high pressure cylinder during one half stroke, and from thence into the tire to be inflated during the following half stroke under compression of the high pressure cylinder.

2. A pump for inflating tires including in combination, high and low pressure cylinders, solid pistons operating in said cylinders, piston rods connected to said pistons and extending in opposite directions, means for reciprocating said piston rods comprising a device having said piston rods attached thereto, and a valve connection for connecting the low pressure cylinder with the high pressure cylinder, whereby said low pressure cylinder is exhausted into the high pressure cylinder during one half stroke, and from thence into the tire to be inflated during the following half stroke under compression of the high pressure cylinder.

3. A pump for inflating tires including in combination, high and low pressure cylinders, pistons for said cylinders, piston rods connected to said pistons and extending in opposite directions, a slide rod connected to said pistons for operating the same, and connections between the cylinders, whereby the air compressed in the low pressure cylinder is exhausted into the high pressure cylinder, and thence forced into the tire to be inflated.

4. A pump for inflating the tires of a motor vehicle, including in combination, a pivoted supporting member, high and low pressure cylinders mounted on said supporting member, pistons located in said cylinders, piston rods connected to said pistons and extending in opposite directions, a rotating crank mounted on said supporting member, means for connecting said rotating crank with said pistons comprising a third rod having said pistons attached thereto, a rotating part for operating said crank carried by said supporting member, and means for swinging said supporting member about its pivot, whereby the rotating part is adapted to be brought into operative connection with a rotating part of the motor vehicle.

In testimony whereof, I have hereunto signed my name, at Philadelphia, Pennsylvania this twelfth day of January 1909.

MARTIN LUTHER BASTIAN.

Witnesses:
 JAMES H. BELL,
 E. L. FULLERTON.